US008933591B2

(12) United States Patent
Jauert

(10) Patent No.: US 8,933,591 B2
(45) Date of Patent: Jan. 13, 2015

(54) ACTIVATABLE AND DEACTIVATABLE SUPPLY UNIT FOR AN ELECTRONIC APPARATUS

(75) Inventor: Joachim Jauert, Berlin (DE)

(73) Assignee: Francotype-Postalia GmbH, Birkenwerder (DE)

( * ) Notice: Subject to any disclaimer, the term of this patent is extended or adjusted under 35 U.S.C. 154(b) by 747 days.

(21) Appl. No.: 13/251,454

(22) Filed: Oct. 3, 2011

(65) Prior Publication Data

US 2012/0120695 A1 May 17, 2012

(30) Foreign Application Priority Data

Nov. 11, 2010 (DE) .................. 20 2010 015 353 U

(51) Int. Cl.
| | |
|---|---|
| H01H 35/00 | (2006.01) |
| H02P 13/00 | (2006.01) |
| H01H 83/00 | (2006.01) |
| G07B 17/00 | (2006.01) |
| G03G 15/00 | (2006.01) |
| G06F 1/26 | (2006.01) |
| G06F 1/32 | (2006.01) |

(52) U.S. Cl.
CPC ...... *G07B 17/00193* (2013.01); *G03G 15/5004* (2013.01); *G03G 15/80* (2013.01); *G06F 1/26* (2013.01); *G06F 1/3203* (2013.01); *G07B 2017/00258* (2013.01)
USPC .......................................... 307/116; 363/100

(58) Field of Classification Search
None
See application file for complete search history.

(56) References Cited

U.S. PATENT DOCUMENTS

| | | | |
|---|---|---|---|
| 5,592,034 A * | 1/1997 | Felmus et al. ............. | 307/130 |
| 5,801,724 A | 9/1998 | Ju | |
| 6,427,183 B1 | 7/2002 | Seidenberg | |
| 6,880,092 B2 | 4/2005 | Jauert | |
| 2003/0189616 A1 | 10/2003 | Yamada | |
| 2005/0012776 A1 | 1/2005 | Kato et al. | |
| 2006/0181718 A1* | 8/2006 | Jauert et al. .................. | 358/1.8 |
| 2010/0188123 A1* | 7/2010 | Fox et al. ..................... | 327/143 |

FOREIGN PATENT DOCUMENTS

| | | |
|---|---|---|
| DE | 3044390 A1 | 6/1982 |
| DE | 3636152 A1 | 4/1988 |
| DE | 697 01 708 T2 | 10/2000 |

* cited by examiner

*Primary Examiner* — Jared Fureman
*Assistant Examiner* — Aqeel Bukhari
(74) *Attorney, Agent, or Firm* — Schiff Hardin LLP

(57) ABSTRACT

A supply unit for an electronic apparatus that can be activated and deactivated has a mains adapter, a first voltage regulator and a voltage source that are connected on the input side with the direct voltage output of the mains adapter, and a logic module supplied by the voltage source with a suitable auxiliary direct voltage. The enable input of the first voltage regulator is connected with the output of the logic module. A switch contact pair is electrically connected to switch the logic module. In the operating mode, a microcomputer is programmed to establish and evaluate the number an duration of the connection of the contact pair. Depending on an evaluation of a user input into the microcomputer, a digital signal is output to switch from the operating mode into standby mode.

14 Claims, 3 Drawing Sheets

US 8,933,591 B2

ACTIVATABLE AND DEACTIVATABLE SUPPLY UNIT FOR AN ELECTRONIC APPARATUS

BACKGROUND OF THE INVENTION

1. Field of the Invention

The invention concerns a supply unit for an electronic apparatus (in particular a printing apparatus) that can be activated and deactivated. As used herein, a "supply unit" is an internal mains adapter that is used in computers and other electronic apparatuses and that is used in combination with a logic circuit. The supply unit can be deactivated automatically and/or manually to reduce the standby power consumption of such an apparatus without a disconnection from the supply network taking place at the mains. It can be reactivated quickly at any time. As used herein, a "printing apparatus" includes, among other things, a printing device that is equipped to print on flat items to be printed during the passage of the flat items through the apparatus. The invention is suitable for use in franking machines, mail franking systems and other printing apparatuses and mail processing apparatus systems.

2. Description of the Prior Art

It is known to separate an apparatus from a supply network via a mains switch in order to avoid the power consumption by the apparatus when it is not in use. An arrangement to detect the switch position of a mains switch is known from European Patent Application EP 1156405 A2.

EP 1156405 A2 discloses a switching mains adapter combined with a special mains switch and with a logic circuit which, according to the logic state of the circuit, is arranged between the mains switch and a microprocessor of the apparatus.

The mains switch contains two switches connected in series which can be opened or closed only in concert. One switch is connected with one contact thereof to one of the two voltage-carrying lines or neutral lines, and with its other contact is connected with a first input of a sensor that, at its output, transmits an output signal corresponding to the switch setting of the mains switch to a microprocessor of the apparatus. By means of an additional switch in parallel with the mains switch and controlled by the microprocessor, a deactivation delay is achieved without the polling of the switch position of the mains switch being negatively affected by this.

Inkjet print heads are used in modern printing apparatuses. In order to prevent the inkjet print head from drying out when there is no printing or when the apparatus is deactivated, the print head must be moved into a sealed position. In order to ensure that the print heads can still be moved into the sealed position after the activation of the mains switches, the microprocessor transmits a deactivation delay signal for the activation of the aforementioned additional switch.

Requirements for internal mains adapters and Energy Star requirements for the standby power consumption that apply as of 20 Jul. 2007 have been published in the Gazette of the European Union of 28 Dec. 2006 L381/90 under Chapter VIII. SPECIFICATIONS FOR COMPUTERS—REVISED EDITION FOR 2007. The apparatuses must be ENERGY STAR compliant or reach the efficiency values for zero load mode and active mode that are provided in the requirements of the ENERGY STAR program for single voltage-alternating current/alternating current mains adapters and external alternating current/direct current mains adapters. An internal mains adapter is accordingly a component that (for example) is accommodated in a computer housing and serves to convert the alternating current mains voltage into direct current voltage(s) for the power supply of the components of the computer. In the sense of the aforementioned specification, an internal mains part must be mounted within the computer housing but separate from the mainboard of the computer. The mains part must be connected with the mains by a single cable without intervening circuits between the mains adapter and the current mains. All power connections from the mains adapter to the components of the computer must also be accommodated within the computer housing (this means that there may be no external cables from the mains adapter to the computer or to individual components of the computer). Internal direct current/direct current converters that serve to convert a single direct current voltage of an external mains adapter into multiple voltages for the computer do not count as internal mains adapters.

Internal mains adapters must have the following modes:

Sleep mode:

A low consumption mode into which the computer transitions automatically after a specific inactivity period or can be manually set. A computer with sleep mode function can quickly be "woken" via network connections or user interface devices.

Standby mode:

(Off) state with the lowest power consumption that cannot be disconnected (affected) by the user, that persists for an unlimited period as long as the apparatus is connected with the mains and is used corresponding to the operating instructions of the manufacturer.

Requirements for stage 2 have applied to power saving functions since 1 January 2009. In addition to the requirements according to stage 1, in ENERGY STAR-compliant computers the complete mains connection in sleep mode must be maintained according to a platform-independent industry standard. Given low data traffic, all computers must reduce their network transfer speeds according to possible industry standards that provide fast transitions between transfer speeds.

In addition to the power saving function, a wake-up event is provided (i.e. an event triggered by the user, a programmed event or external events or pulses) that has the effect that the computer transitions from its sleep or standby mode into its active operating mode. Such wake-up events are, among other things, mouse movements, keyboard inputs or the operation of a button on the housing and—in the case of external events—pulses that are transmitted via remote control, network, modem etc.

SUMMARY OF THE INVENTION

An object of the invention is to provide a technical solution for an electronic apparatus (in particular a printing apparatus) that, without using a mains switch, ensures that the Energy Star requirements for the standby power consumption are complied with by the franking machine, and that still allows the inkjet print head to be moved into the sealed position when the apparatus is switched over into standby mode or into a mode in which printing does not occur; and wherein all inputs into the apparatus are enabled in a simple manner and with little effort.

The object is achieved with the features of a supply unit for an electronic apparatus (in particular a printing apparatus) according to Patent claim 1, which supply unit can be switched on and off.

A standard power supply that satisfies the Energy Star requirements for the standby power consumption (and therefore can be connected, permanently switched on, to the mains) is used in the apparatus. A number of functional units of the apparatus are supplied by the output voltage, for example of a switch-mode power supply and from the voltages derived from this output voltage. In accordance with the invention, a first voltage regulator and a power supply are provided as a supply unit, with the voltage regulator and the power supply being arranged on a mainboard of the apparatus and connected at the input side with the direct voltage output of the switch-mode power supply. The supply unit furthermore has a logic module that is supplied by the voltage source with a suitable auxiliary direct voltage that is conducted away in a known manner from the output direct voltage of the switch-mode power supply. The first voltage regulator can be switched on or off, controlled via the logic module. A switching contact pair is connected to the logic module, the contacts of the switching contact pair being electrically connected with one another to produce switching of the logic module in order to cause a switch from a first state of the electronic apparatus to a second state via the logic module. A first contact of the switching contact pair is connected to the auxiliary direct voltage, and a second contact of the switching contact pair is connected to a first input of the logic module and to a control input of a microcomputer of a control unit. The microcomputer is programmed in an operating mode via a program stored in a program memory in order to establish and evaluate the number and duration of the connection of the switching contact pair. As a result a user input is made in the apparatus, or a switching between states of the apparatus, and depending on the evaluation thereof in the microcomputer, a digital signal is output at a control output for switching from the operating mode into a standby mode. A second input of the logic module is connected to the control output.

A flip-flop can be used as a logic module. As is known, a flip-flop is an electronic component of the bistable trigger circuit and its logic basis. A flip-flop can assume two stable states (one or zero) and store these. A data set of one bit therefore can be stored over a long period of time. The flip-flop has NOT elements (NOT gate, inverter) with a special wiring at the first input to set the flip-flop and at the second input to reset the flip-flop. The logic module has a number of NOT elements, and the input of a first NOT element forms the first input of the logic module; and a second NOT element and a third NOT element are connected to form a flip-flop. The input of the second NOT element is connected with the output of the first NOT element and on the other side, via a series circuit of a diode and an ohmic resistor, with the second input of the logic module. The first NOT element is formed by a first transistor, the emitter of which is connected to ground; and an ohmic resistor is connected between the collector of the first transistor and the output of the third NOT element.

The switch contact pair is a component of a circuit closer that can be activated to switch the electronic apparatus between a first state and a second state, at least from a standby mode into an operating mode and vice versa. A circuit closer means a switch with two terminals that only opens or closes an electrical circuit. The switch produces the activation and deactivation of current as a result of its activation.

The circuit arrangement in accordance with the invention enables input of information as a result of the activation, with the input of information being made based on a user input in an electronic apparatus, since the apparatus has a microcomputer that can determine each activation action while the electronic apparatus is found in the operating mode.

The two contacts of the switching contact pair can be electrically connected with one another in order to switch the electronic apparatus from the standby mode into the operating mode via the logic module and independent of a program stored in a program memory, in order to switch the electronic apparatus (which in the operating mode is controlled by the program stored in the program memory) from one state into another state. Via the connection of the aforementioned two contacts of the circuit closer, an input is made in the operating mode when the time duration of the activation of the circuit closer reaches a predetermined first time duration and a falls short of a second time duration, and/or the electronic apparatus is switched from an operating mode into a standby mode when the time duration of the activation reaches or exceeds a predetermined second time duration.

Given positive logic, a high level (H-level) corresponds to a signal with a digital value of "one" and a low level (L-level) corresponds to a signal with a digital value of "zero".

DESCRIPTION OF THE PREFERRED EMBODIMENTS

Figure 1:
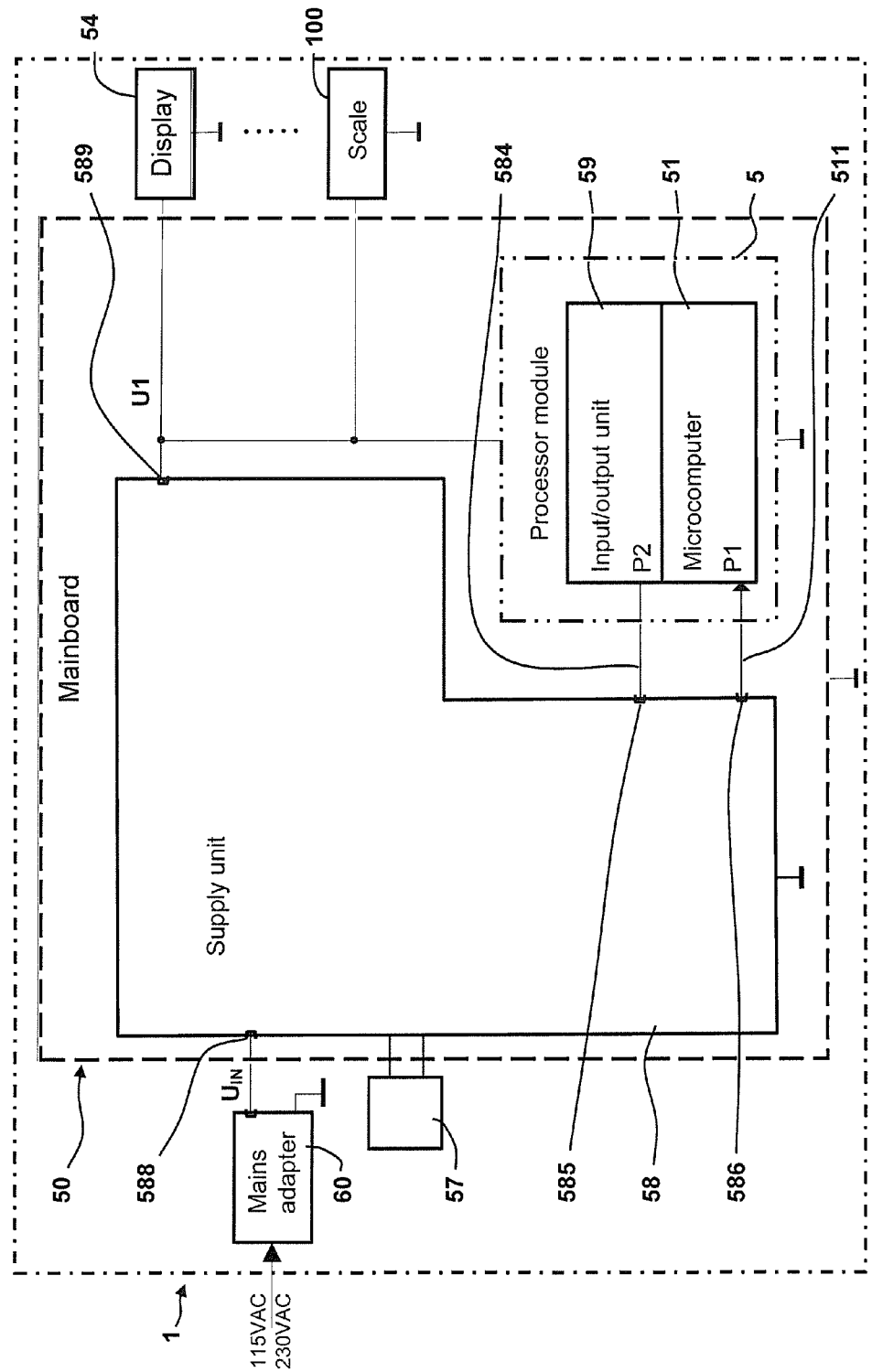
FIG. 1 shows a circuit arrangement to supply power to an electronic apparatus in accordance with the invention.

A circuit arrangement to supply power to an electronic apparatus 1 that has an internal switch-mode power supply 60 is shown in FIG. 1. The switch-mode power supply 60 is connected at the input side with the mains, which has an alternating voltage of 115 $V_{AC}$ or 230 $V_{AC}$. The output direct voltage of the switch-mode power supply 60 is $U_{IN}$=24 $V_{DC}$. The switch-mode power supply 60 is connected at the output side with a supply input 588 of a power supply 58 of an electronic apparatus 1 (dash/dot line). A processor module 5 (dash/double-dot line) and the power supply 58 are arranged together on a mainboard and form a control unit 50 (dashed line). The control unit 50 has a microcomputer 51, an input/output unit 59 and additional structural groups. The power supply 58 delivers a first output direct voltage U1 at the supply output 589 and direct current up to a predetermined limit value. A number of function units of the electronic apparatus 1, such as the processor module, a display 54 or the electronics of a scale 100, are supplied by this output voltage 01 and by voltages that may be derived from this. The display and an associated controller (not shown) can be arranged separate from the mainboard in the apparatus 1. A control output P2 of the input/output unit 59 is connected via a control line 584 with a control input 585 of the power supply 58. A deactivation signal can be output at the control output P2. The standby power consumption of the electronic apparatus is reduced by the deactivation of a first voltage regulator of the power supply 58 so far that the Energy Star requirements are satisfied. A control output 586 of the power supply 58 is connected via a control line 511 with an input P1 of the microcomputer 51. A circuit closer 57 is connected with the power supply 58. A circuit closer 57 can be executed as a button, for example of the type MP1002/28/BL of the Bulgin company, or as a commercially available microswitch.

The input/output unit 59 is preferably realized with a separate module. Programmable logic, for example a Spartan-II 3A FPGA der Firma XILINX or an application-specific integrated circuit (ASIC), can be used.

Figures 2, 3:
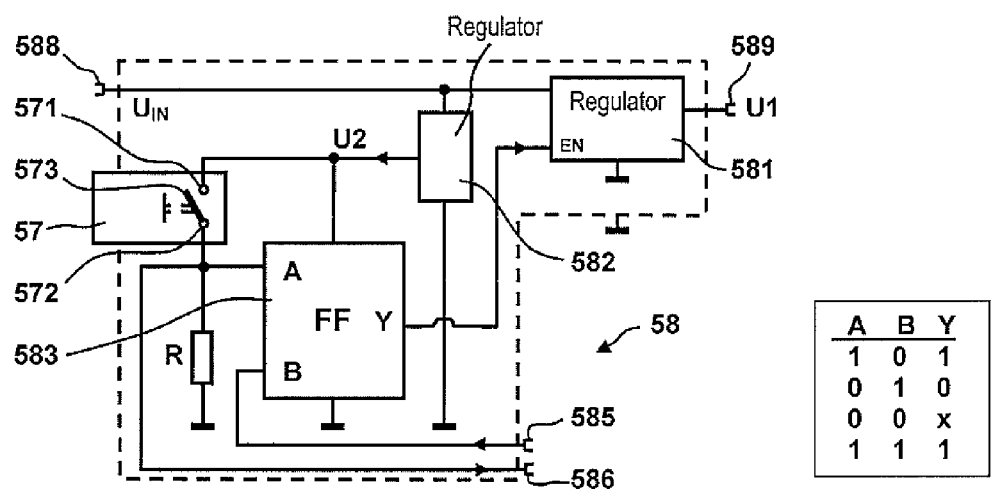
FIG. 2 shows a circuit arrangement of a power supply of an electronic apparatus that can be activated and deactivated in accordance with the invention.
FIG. 3 shows the truth table of an RS flip-flop.

The circuit arrangement of a power supply 58 of an electronic apparatus (which power supply 58 can be switched on and off) is shown in FIG. 2. The output direct voltage of the switch-mode power supply is $U_{IN}=24 V_{DC}$. This is applied at the input 588 and, among other things, supplies a first switchable voltage regulator 581 that generates an output direct voltage $U1=5 V_{DC}$ as a supply voltage of the apparatus and outputs it at the output 589. The first voltage regulator has an enable input EN that is connected with the output Y of a logic module 583 and can be switched on and off via the latter. For example, an unclocked, state-controlled RS flip-flop which has the two inputs A and B is used as a logic module. Its function is to store short deactivation or activation signals over a long period of time.

A second voltage regulator 582 that generates a second output direct voltage $U2=5 V_{DC}$ serves as a voltage source for the auxiliary direct voltage required to operate the flip-flop 583. The voltage regulator 582 is a linear regulator, for example, and the first voltage regulator 581 operates as a direct voltage/direct voltage converter (DC/DC converter).

The microcomputer is programmed to move the print heads into the sealed position and to subsequently output a deactivation signal in order to set the flip-flop 583 to the state Y=0 so that the first voltage regulator 581 is deactivated. The deactivation signal is present at a control input 585. Via the deactivation signal with a logic level of "one" that is applied at the second input B of the FF—i.e. given B=1—the FF 583 is set to a state with the output-side logic level Y=0, which deactivates the first voltage regulator 581.

The circuit closer 57 has a contact pair. Its contacts 571 and 572 are electrically connected with one another by a contact piece 573 in order to switch the flip-flop—and ultimately the electronic apparatus—from a deactivated state into an activated state. The contact piece is a component of the circuit closer and is manually pressed by a button at the contact pair. The first contact 571 is connected with the second output direct voltage and the second contact 572 is connected to ground via a resistor R.

The first voltage regulator 581 can be switched on or, respectively, off via the flip-flop (FF) 583. Via a circuit closer 57 (that, for example, can be activated via a special button) a logic level of "one" is set at the input A of the FF 583 (i.e. A=1). The FF is set to a state with the logic level of "one" at the output side (i.e. Y=1), which activates the first voltage regulator 581. Via the control output 586 [sic] power supply 58 the level is also present at the input of the microcomputer and is detected by the latter.

The truth table of the RS flip-flop is shown in FIG. 3. A logic level of "zero" at the inputs A and B of the flip-flop simultaneously does not yield a logic level change at the output Y of the flip-flop. The logic level of "one" at the input A shifts the flip-flop into the "set" state. The output Y of the flip-flop is set to the logic level of "one", thus Y=1. The logic level of "one" at the input B shifts the flip-flop into the "reset" state, under the assumption that at the same time a logic level of "zero" is present at the input A of the flip-flop. The output Y of the flip-flop is set to the logic level of "zero", thus Y=0. In the event that A=1, B=1, Y=1 results. The expression Y=X means that the output signal remains unchanged. A module or a corresponding circuit made of transistors is suitable as a flip-flop circuit (FF).

Figure 4:
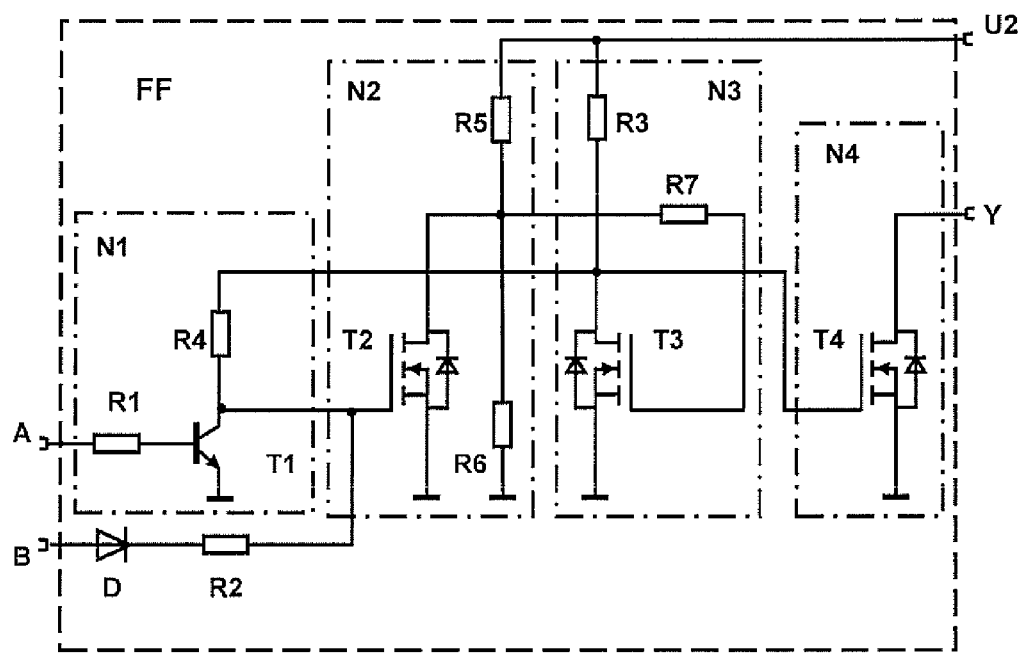
FIG. 4 shows a circuit arrangement of an RS flip-flop with n-channel MOSFETs that is suitable for use in the inventive circuit arrangement.

FIG. 4 shows a circuit arrangement of an RS flip-flop with n-channel MOSFETs of the enhancement type. Two MOSFETs (metal oxide semiconductor field effect transistors) T2 and T3 are connected as a flip-flop (FF), meaning that the gate terminal of the respective one MOSFE transistor T2 (or T3) is connected with the drain terminal of the respective other MOSFE transistor T3 (or T2). The source terminal of all MOSFETs is connected with a ground pot. The first input A of the RS flip-flop leads via an ohmic resistor R1 to the base terminal of a first npn transistor T1 whose emitter terminal is directly connected with the ground potential and whose collector terminal is directly connected with the gate terminal of the second MOSFE transistor T2. The gate terminal is likewise connected via a series circuit with the second input B of the FF, wherein the series circuit consists of an ohmic resistor R2 and a diode D, wherein the diode has a p/n transition and is connected so that its p-region points in the direction of the second input B. The collector terminal of the first npn transistor T1 is connected via an ohmic resistor R4 with the drain terminal of a third MOSFE transistor T3. An ohmic resistor R3 that is connected between the drain terminal of the third MOSFE transistor T3 and the auxiliary voltage U2 supplies the gate of the second MOSFE transistor T2 with a control voltage; the latter is switched to a conductive state as soon as the auxiliary voltage U2 is provided but no high level is present at the inputs A and B of the FF. An ohmic resistor R5 is connected between the drain terminal of the second MOSFE transistor T2 and the auxiliary voltage U2, and an ohmic resistor R6 is connected between the drain terminal of the second MOSFE transistor T2 and a ground potential. The two resistors R5 and R6 are connected as voltage splitters that (for example) halve the level of the auxiliary voltage U2 at the center tap. The first npn transistor T1, together with its collector resistor R4, then operates as a first NOT element when the third MOSFE transistor T3 is switched into a non-conductive state (i.e. is blocked). The NOT element N1 negates the digital value of a voltage level of a signal which is present at the first input A. Given a positive logic, a high level has the digital value of 1. If such a high level is present at the first input A, the output of the NOT element then emits a low level and its digital value is then zero. Low levels—for example 0 to 0.7 V—are then considered to be zero. Since the collector terminal of the first npn transistor T1 is likewise connected with the second input B of the FF via an ohmic resistor R2 and a diode D, both (thus the first npn transistor T1 and the diode D) operate at a common ohmic resistance R4 and thus realize a logical wired OR link. The latter will negate the signal at the first input A and supply the signal negated at the first input A and not negated at the second input B. Situated at the center tap of the voltage splitter R5, R6 is the drain terminal of the second MOSFE transistor T2 with which a gate terminal of the third MOSFE transistor T3 is connected via an ohmic resistor R7. The gate terminal of a fourth MOSFE transistor T4 is connected with the drain terminal of the third MOSFE transistor T3. An output signal is emitted at the drain terminal of the fourth MOSFE transistor T4, wherein an internal resistance of a subsequently connected circuit of the first regulator 581 acts as a collector resistor. All aforementioned MOSFE transistors thus act as NOT elements N2, N3 or, respectively, N4, wherein the output of the fourth NOT element N4 forms the output of the logic module 583. All ohmic resistors have the same value as R1, except for the ohmic resistor R2, wherein it applies that: R2<R1. Given a digital value of zero at the second input B (B=0) and zero at the first input (A=0), and given a digital value B=0 and A=1, the diode D is blocked. However, the diode D is conductive given a digital value of B=1 and A=1. The ohmic resistor R2 then serves to limit current. Given a digital value of B=0 and A=1, the first npn transistor T1 is conductive, the second MOSFE transistor T2 is blocked and the voltage at the center tap of the voltage splitter R5, R6 rises to approximately ½·U2, and consequently the third MOSFE transistor T3 is conductive and thus a low voltage potential which does not exceed the switching threshold of the fourth MOSFE transistor T4 is present at the downstream gate terminal of the fourth MOSFE transistor T4. A high level—i.e. the digital al 1—is thus present at the output Y. At this state even a change of the signal level at A to a digital value A=0 is not altered if B=0 is maintained because the third MOSFE transistor T3 is switched to a conductive state, which prevents a high level—which could arrive at the gate terminal of the second MOSFE transistor T2—from being present via the ohmic resistor R4. The second MOSFE transistor T2 consequently continues to be blocked, the voltage at the center tap of the voltage splitter R5, R6 is ½·U2, and furthermore the digital value 1 continues to be present at the output U. Given a change of the signal to a digital value of B=1 while maintaining A=0, a high level is present at the gate terminal of the second MOSFE transistor T2, and the latter is switched to a conductive state. The voltage at the center tap of the voltage splitter R5, R6 falls below a threshold which does not exceed the switching threshold of the third MOSFE transistor T3. The third MOSFE transistor T3 is consequently blocked, and the fourth MOSFE transistor T4 is consequently conductive, and the output Y emits a low level, meaning that the digital value is zero (Y=0). Since the third MOSFE transistor T3 is blocked, a high level continues to be present at the gate terminal of the second MOSFE transistor T2 via the ohmic resistor R3, even given a change of the signal at the second input B to a digital value of zero (B=0) and given maintenance of the signal at the first input A with the digital value of zero (A=0). The second MOSFE transistor T2 is consequently conductive, the third MOSFE transistor T3 is blocked and the fourth MOSFE transistor T4 is conductive, and the output Y emits a low level, meaning that the digital value is zero (Y=0). Given a digital signal of one at both inputs A and B, the first npn transistor T1 is conductive and a low level is present at the gate terminal of the second MOSFE transistor T2. The second MOSFE transistor T2 is consequently blocked, the third MOSFE transistor T3 is conductive and the fourth MOSFE transistor T4 is blocked, and a high level appears at the output Y, i.e. the digital value is one (Y=1).

Figure 5:
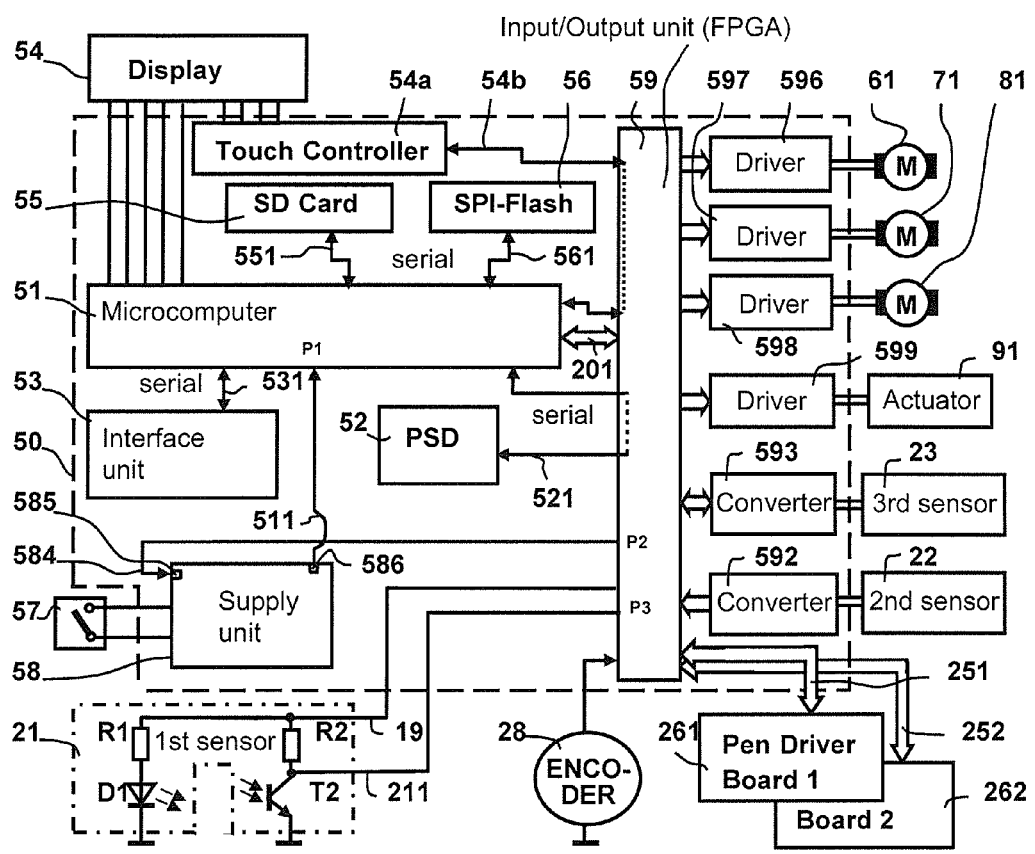
FIG. 5 shows circuit arrangement of the control unit of a printing apparatus in accordance with the invention.

FIG. 5 shows a circuit arrangement of the control unit of a printing apparatus. The electronic control unit 50 contains a security module 52 and a non-volatile memory 56 which, in terms of operation, are connected with a microcomputer 51 of the electronic control unit 50, wherein the microcomputer 51 is moreover connected with an input/output unit 59 via an internal bus 201 to which the input means (sensors) are connected and which controls the (likewise connected) output means (drivers, actuators etc.). For example, a Postal Security Device (PSD) is suitable as a security module 52. An SPI-FLASH is used as a non-volatile memory 56 for a boot program and an SD card 55 is used as a program memory. Both are connected respectively via serial data lines 561, 551 with the microcomputer 51. The SD card 55 moreover contains different printing plate data for franking imprints. An additional NVRAM (not shown) for data is also connected to the microcomputer 51.

The PSD 52, the SD card 55 and the SPI flash 56 are connected in terms of operation with the microcomputer, for example directly or indirectly via serial data lines. For example, the serial data line 521 to the PSD 52 is looped through the input/output unit 59 to the PSD 52. The input/output unit 59 controls at least data and control lines 251, 252 to additional modules (pen driver boards) 261, 262 of the printing apparatus. An encoder 28 is connected to the input/output unit 59. A freely programmable gate array (FPGA) is suitable as an input/output unit 59.

The control unit 50 is programmed to be switched into the standby mode and/or for an input of information by the user of the apparatus based on a corresponding user input via a button at the circuit closer 57. For an input of information by the user, at least one button press exerted over a predetermined first time period is used, while a button press exerted over a predetermined second time period is used to switch into the standby mode, wherein the first time period is shorter than the second time period.

Alternatively, another suitable activation means (not shown) or an activation field of the user interface can be used to switch into the standby mode. A separate activation means or a keyboard or a touchscreen can be used for this without the length of the time period playing a role.

Additionally or alternatively, the control unit 50 can be programmed to switch into the standby mode due to the passage of a period of time. Given programming due to the passage of time, the microcomputer automatically switches into the standby mode after a defined inactivity period, wherein what is understood by "inactivity period" is a time period in which the user neither makes inputs, not is the apparatus used. Even without pressing a button, a corresponding high signal is provided with time delay at a pin P2 in order to switch the printing apparatus into the standby mode.

A supply unit 58 that supplies the entirety of the electronics of the apparatus with power has a control input 585 to switch the power supply into the standby mode. For this purpose the microcomputer 51 is connected with the control input 585 via the input/output unit 59 and a conductor 584. Given the press of a button a corresponding high signal is also provided at a pin P2 in order to switch the printing apparatus into standby mode.

The circuit closer 57 is connected to the supply unit 58 in order to enable a reversion of the control unit 50 into the operating mode from the standby mode. The supply unit can be arranged as an integrated component of the control unit 50, or can also be arranged (the manner is not shown) separate from the control unit 50 in the electronic apparatus. A short-term pressing on the button of the circuit closer 57 is sufficient to switch the flip-flop of the supply unit (and thus an electronic apparatus) into the operating mode again. Given a subsequent activation of the button, the apparatus is switched again into the standby mode by the microcomputer. In order to prevent an unintentional contact of the button already from causing a switch into the standby mode, it is provided that the microcomputer evaluates the time period of the uninterrupted activation of the button, wherein only a button press exerted over the longer predetermined second time period produces a switching of the electronic apparatus into the standby mode. In the operating mode of the franking machine, an activation of the button for only a short period of time thus does not enable a switch into the standby mode.

The electronic apparatus is a printing apparatus, advantageously a franking machine. The control unit 50 of the franking machine is connected with additional input means, for example with sensors 21, 22, 23. It is provided that the control unit 50 of the printing apparatus has a microcomputer 51 that is operationally connected directly or indirectly via input/output unit 59 with the security module 52, with an interface unit 53, directly with a display 54, with an SD card 55, with a non-volatile memory 56, and with the input/output unit 59.

The microcomputer 51 contains (the manner is not shown) a display controller to activate the display 54 arranged external to the control unit. In the present exemplary embodiment, for display and input a touch display is used which is connected via a touch controller 54a to the input/output unit 59.

The microcomputer 51 is operationally connected with the touch controller 54a via a serial bus 54b that is looped through the input/output unit 59.

The control unit 50 is thus programmed to switch into the standby mode due to a corresponding user interface via circuit closer 57, user interface and/or due to the passage of time.

Before switching from operating mode into standby mode, via a first driver 596 the input/output unit 59 activates a first motor 61 to transversally shift the printer carriage 24 in the event that the print head has not already arrived in the sealed position, wherein a first sensor 21 that signals that the printer carriage has reached a sealed position is connected to the input/output unit 59. Regarding the latter, the first regulator of the supply unit 58 is controlled by the microcomputer 51 via the input/output unit 59. The operating mode is reached after activation of the button by the user and as a result of the reactivation of the power supply via the first regulator of the supply unit 58.

A second sensor 22 is connected to the input/output unit 59, and the input/output unit 59 is connected to a second motor 71 via a second driver 597. After the control unit 50 of the printer apparatus is switched into the operating mode, in a printing mode the second motor 71 is controlled to drive a transport belt of the printing device for printing a flat good if the second sensor 22 signals the presence of a flat good in the feed path.

The control unit 50 can be equipped with at least one interface unit 53, wherein the latter serves for data transfer, thus not only to receive but also to output and relay messages via a network to one of the communication participants of a system. A communication unit or, respectively, a communication mode to process messages is integrated into the microcomputer.

The output means of the electronic control unit are a display controller to output via display 54; a number of controllable drivers 596, 597, 598 or, respectively, 599 for motors 61, 71, 81 or, respectively, an actuator 91; at least one controllable measurement arrangement (transducer) 593; and also the at least one interface unit 53. The at least one interface unit 53 and the transducer s 592, 593 as well as the sensors 21, 22, 23 also act together as input means.

The microcomputer 51 is connected via serial data lines 531 with the interface unit 53. A controller (not shown) can be a component of the interface unit 53 or of the microcomputer 51 that is provided in order to process the interface data.

The communication unit, like the display unit, can also be realized as a separate module of the printing apparatus.

In the exemplary embodiment described in the preceding the microcomputer is connected via the input/output unit 59 with the security module 52. Alternatively, the microcomputer 51 can also be directly connected with the security module 52. Serial data lines are advantageously used in order to operationally connect the microcomputer 51 and the security module 52.

In a printing apparatus (in particular a franking machine), before switching into a standby mode a first motor is activated by the control unit, and a print head carriage is moved via a drive means coupled with the motor into a sealed position in the event that this has not yet occurred. A cleaning and sealing station prevents the inkjet print heads from drying out in the sealed position. A first sensor 21 is arranged at a first position in order to output a signal to the control unit depending on the position of the print head carriage, this control unit emitting a deactivation signal as an output at the second input of the logic module.

For example, the first sensor 21 is realized as a thru-beam sensor. The interruption of a light beam of the thru-beam sensor (which light beam is emitted by a light source D1, for example a light-emitting diode) causes a signal change at a light detector T2, for example a pnp phototransistor. The light source D1 is connected via a resistor R1 and a conductor 19 to the input/output unit 59 to supply power. The light beam or the remaining residual light can additionally be focused (the manner is not shown) by a lens on the light detector. The latter emits an analog signal corresponding to the received light intensity, which analog signal can be converted via a non-linear structural element into a digital signal. The first sensor 21 is connected at the output side via a conductor 211 to a pin P3 of the input/output unit 59. It has been found that it is sufficient if the phototransistor is switched so as to be a NOT element that, upon falling below an adjustable threshold of the analog signal, outputs a digital signal (H-level) via a conductor 211 to the input/output unit 59. Given a high level—thus given a signal with a digital value of "one"—the sealed position is achieved. The microcomputer 51 is programmed to output a control signal with the digital value of "one" (high level) to the control output P2 of the input/output unit 59 as soon as a signal with the digital value of "one" is emitted by the first sensor 21 when the apparatus should be switched into standby mode.

If it is necessary, a known Schmidt trigger can additionally be realized as an analog/digital converter within the first sensor 21 or the input/output unit 59.

The first sensor 21 can alternatively be realized as a microswitch, for example.

Another alternative solution variant does not require a signal from a first sensor, but rather assumes that a predetermined first time period for the movement of the print head carriage up to the sealed position is required, starting from switching over into a standby mode. A second, constant time period acts as an additional safety factor. The microcomputer of the control unit detects that it should be switched into the standby mode an outputs a deactivation signal, delayed by the aforementioned first time period and the constant time period, at the second input of the logic module, which leads with high certainty to the deactivation of the first voltage regulator only after the print head carriage has reached the sealed position.

The circuit closer 57 is connected to the logic module of the power supply unit 58 (shown in FIG. 2). An RS flip-flop is suitable to trigger a reactivation of the power supply of the apparatus before a switching over into the operating mode. A contact part which can be activated by a button is associated with the contact pair of the circuit closer 57. The circuit closer is thus fashioned as what is known as a button.

According to an alternative variant, the contact part can be a microswitch.

A contact part 573 is associated with the switch contact pair 571, 572 of the circuit closer 57, and the circuit closer is fashioned as a button, or the contact part can be a component of a microswitch and that, in the operating mode, the microcomputer 51 is programmed by a program stored in a program memory in order to switch the electronic apparatus from one state into another state or, respectively, in order to made a different input or switch into the standby mode due to an activation of the button or microswitch.

The two contacts of the contact pair can alternatively be automatically electrically connected with one another by an electronic switch in order to switch over the electronic apparatus from one state into another state, or in order to produce a different input. If necessary the electronic switch can also be activated from the outside.

The two contacts of the switch contact pair of the circuit closer 57 can be electrically connected with one another in order to switch an electronic apparatus which is found in the standby mode from the standby mode into the operating mode via the logic module, and independent of a program stored in the program memory 55.

In the operating mode, the aforementioned circuit arrangement of the controller in connection with the program stored in the program memory has the effect that the electronic apparatus is switched from one state into another state, wherein due to the connection of the aforementioned two contacts of the circuit closer an input is made in the operating mode if the time period of the activation of the circuit closer reaches a predetermined first duration and falls below a second duration, wherein the first time duration is shorter than the second time duration.

The control unit 50 is thus programmed based on a corresponding user input via circuit closer 57 and a corresponding program for a data input, wherein the input does not trigger a switch over into the standby mode but rather a different function when the activation duration of the circuit closer 57 does not exceed a first predetermined time period. For this, an indication for the activation of the circuit closer 57 is displayed in the screen of the display, for example, "push the button once for the picture the time before!", "push the button two times for a second picture!" or "push the button three times for changing the input mode!" For example, the depiction presented on the screen can therefore be changed in its form and/or content without the touch function of the display being used. Given a brief activation of the button, the microcomputer can thus interpret the input depending on whether the number corresponds to that number that is predetermined by the screen or, respectively, menu indicated by the display. If these agree, a specific function of the apparatus that is associated with the respective input is triggered.

Alternatively, the microcomputer can also interpret the input depending on whether the number corresponds to that number that is provided by the manual in order to trigger a predetermined function.

Given a corresponding listing shown on the display, wherein a value is juxtaposed with the number of button presses, a step-like increase of value inputs can likewise be implemented without the display having to be contacted for this.

The aforementioned circuit arrangement with the controller and the first sensor, in connection with the program stored in program memory, enables the electronic apparatus to switch from an operating mode into a standby mode when the duration of the activation of the circuit closer 57 reaches or exceeds the predetermined second duration.

According to FIG. 2, the supply unit 58 contains a linear regulator 582 as a source of the auxiliary direct voltage U2 for the logic module that that is fashioned as a flip-flop 583.

Alternatively a different type of voltage source can be provided which generates the auxiliary direct voltage U2. For example, a voltage splitter is suitable. The logic module can be connected at the center tap of the voltage splitter, and therefore can be supplied with a voltage which is directed discharged from the output voltage of the switch-mode power supply.

Even if the invention was also illustrated in the exemplary embodiment using a positive logic, a use of a negative logic, the sensors and/or the control unit or, respectively, a mixed use of both logic types should not thereby be precluded for a different embodiment of the supply unit that can be switched on and off.

The microcomputer 51 and the input/output unit 59 can alternatively also be arranged as separate modules on the mainboard for realization as a processor module.

Although modifications and changes may be suggested by those skilled in the art, it is the intention of the inventor to embody within the patent warranted hereon all changes and modifications as reasonably and properly come within the scope of his contribution to the art.

I claim as my invention:

1. A supply unit for an activatable and deactivatable electronic apparatus, that can be activated and deactivated, which supply unit has a mains adapter, wherein the supply unit has a first voltage regulator and a voltage source which are connected at the input side with the direct voltage output of the mains adapter, characterized in that the supply unit has a logic module which is supplied by the voltage source with a suitable auxiliary directed voltage; that the first voltage regulator has an enable input that is connected with the output of the logic module and can be activated or, respectively, deactivated as controlled by the latter, wherein a switching contact pair is provided whose contacts are connected with one another to switch over the logic module; that a first contact of the switching contact pair is connected to the auxiliary direct voltage of the logic module and a second contact of the switching contact pair is connected on the one hand to an input of the logic module and on the other hand via the control output of the supply unit to an input of a microcomputer of a control unit; that, in the operating mode, the microcomputer is programmed by a program stored in a program memory in order to establish and evaluate the number and duration of the connection of the contact pair, wherein as a result an input of information is made based on a user input into the apparatus or a switching between states of the apparatus, wherein depending on the evaluation of the input in the microcomputer a digital signal is emitted at a control output to switch from the operating mode into a standby mode; and that a second input of the logic module is connected to the control output via a control input of the supply unit.

2. Supply unit according to claim 1 comprising contact piece associated with the switch contact pair of a circuit closer and a circuit closer is fashioned as a button; or the contact piece is a component of a microswitch; and, in the operating mode, the processor is programmed to switch the electronic apparatus from one state into another state, or in order to make a switch into the standby mode due to an activation of the button or microswitch.

3. Supply unit according to claim 1 when the logic module has a number of NOT elements, wherein the input of a first NOT element forms the first input of the logic module, wherein a second NOT element and a third NOT element are wired to form a flip-flop, wherein the input of the second NOT element is connected with the output of the first NOT element and, via a series circuit of a diode and an ohmic resistor, with the second input of the logic module, wherein the first NOT element consists of a first transistor having an emitter connected to ground; and an ohmic resistor is wired between the collector of the first transistor and the output of the third NOT element; and when the control unit is programmed to switch into standby mode due to a passage of time or an activation of the button, and a digital signal is emitted via the control output at the second input of the logic module.

4. Supply unit according to claim 1 comprising an input of a fourth NOT element is connected at the output of the third NOT element, wherein the output of the fourth NOT element forms the output of the logic module.

5. Supply unit according to claim 1, wherein the two contacts of the contact pair are electrically connected with one another automatically by an electronic switch in order to switch the electronic apparatus from one state into another state, or to produce a different input.

6. Supply unit according to claim 1 wherein the auxiliary direct voltage is derived from the output direct voltage of the mains adapter.

7. Supply unit according to claim 1 wherein the processor is operationally connected with a non-volatile memory and with an input/output unit, a display is connected via a touch controller to the input/output unit and the control unit for switching into the standby mode due to a corresponding user input via a button at the circuit closer or another suitable activation means or an activation panel of the user interface, and/or due to a passage of time; that the input/output unit is connected via a first driver with a motor in order to activate the motor for a transverse displacement of a printer carriage before the control unit is switched over into standby mode; and that a sensor is connected at the output side via a conductor to a pin of the input/output unit that signals that the printer carriage has reached a sealed position by emitting a signal with a digital value of "one"; that the microcomputer is programmed to output at the control output of the input/output unit a control signal as soon as a signal with a digital value of "one" is emitted by a first sensor when the apparatus should be switched into the standby mode.

8. Supply unit according to claim 7 that can be activated and deactivated, wherein the sensor is a first sensor formed as a thru-beam sensor or a microswitch;

and consisting a second sensor connected to the input/output unit and wherein the input/output unit is connected via a second driver to a second motor and activates the latter to drive a transport belt of the printing carriage to print a flat good when the control unit is switched into the operating mode and when the second sensor signals the presence of a flat item.

9. Supply unit according to claim 7 wherein the processor is operationally connected via the input/output unit or directly with a security module.

10. Supply unit according to claim 7 wherein a SPI-FLASH that is connected with the microcomputer via a serial data line used as a non-volatile memory.

11. Supply unit according to claim 1, wherein the processor is connected with an interface unit via a serial data line and with the input/output unit via an internal bus.

12. Supply unit according to claim 1 comprising a freely programmable gate array (FPGA) programmed as an input/output unit.

13. Supply unit according to claim 1 wherein a SD card forms a program memory that is operationally connected with the processor via serial data lines.

14. Supply unit according to claim 1 comprising a circuit closer connected to the power supply in order to trigger a reactivation of the power supply of the apparatus before switching over from standby mode into the operating mode via the logic module and the voltage regulator.

* * * * *